United States Patent
Ahn et al.

(10) Patent No.: US 8,466,904 B2
(45) Date of Patent: Jun. 18, 2013

(54) LIGHT SENSING CIRCUIT AND FLAT PANEL DISPLAY INCLUDING THE SAME

(75) Inventors: Soon-Sung Ahn, Yongin (KR); Do-Youb Kim, Yongin (KR); Sung-Un Park, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 929 days.

(21) Appl. No.: 12/585,616

(22) Filed: Sep. 18, 2009

(65) Prior Publication Data
US 2010/0096997 A1   Apr. 22, 2010

(30) Foreign Application Priority Data
Oct. 17, 2008   (KR) .................. 10-2008-0102105

(51) Int. Cl.
*G06F 3/038* (2006.01)
(52) U.S. Cl.
USPC .......................................... 345/204; 345/207
(58) Field of Classification Search
USPC ....................................... 345/204–207, 690
See application file for complete search history.

(56) References Cited

U.S. PATENT DOCUMENTS

| | | | | |
|---|---|---|---|---|
| 8,179,386 B2 * | 5/2012 | Katoh et al. | ................... | 345/207 |
| 8,232,955 B2 * | 7/2012 | Kwon | ............................ | 345/101 |
| 2003/0117126 A1 * | 6/2003 | Rahmatian | ..................... | 324/96 |
| 2005/0218302 A1 * | 10/2005 | Shin et al. | ................. | 250/214 R |
| 2008/0001912 A1 * | 1/2008 | Koide et al. | .................... | 345/102 |
| 2010/0060562 A1 * | 3/2010 | Hadwen et al. | .............. | 345/102 |

FOREIGN PATENT DOCUMENTS

| | | |
|---|---|---|
| JP | 2007065004 A | 3/2007 |
| JP | 2007233061 A | 9/2007 |
| KR | 1020050107092 A | 11/2005 |
| KR | 1020070026188 A | 3/2007 |

OTHER PUBLICATIONS

Registration Determination Certificate issued on Aug. 9, 2010 by the Korean Intellectual Property Office for Korean Application No. 10-2008-0102105 corresponding to U.S. Appl. No. 12/585,616, together with Request for Entry.

* cited by examiner

*Primary Examiner* — Tung X Le
(74) *Attorney, Agent, or Firm* — Robert E. Bushnell, Esq.

(57) ABSTRACT

A light sensing circuit for use in auto brightness control (ABC), and a flat panel display including the light sensing circuit. The light sensing circuit includes a first photodiode; a second photodiode which is electrically connected to the first photodiode and includes a shielding film for shielding externally incident light; a first voltage fixing unit which is connected to the first photodiode and the second photodiode and maintains a voltage applied to the first photodiode at a certain value; and an analog-to-digital converter (ADC) which generates a digital value that depends on a current flowing in the first photodiode and the second photodiode. Accordingly, the light sensing circuit can precisely sense the brightness of a surrounding environment and drive a flat panel display with the most suitable brightness.

22 Claims, 8 Drawing Sheets

LIGHT SENSING CIRCUIT AND FLAT PANEL DISPLAY INCLUDING THE SAME

CROSS REFERENCE TO RELATED APPLICATIONS

This application makes reference to, incorporates the same herein, and claims all benefits accruing under 35 U.S.C. §119 from an application entitled LIGHT SENSING CIRCUIT AND FLAT PANEL DISPLAY INCLUDING THE SAME earlier filed in the Korean Industrial Property Office on 17 Oct. 2008, which was duly assigned Serial No. 10-2008-0102105 by that Office.

BACKGROUND OF THE INVENTION

1. Field of the Invention

The present invention relates to a light sensing circuit and a flat panel display including the light sensing circuit, and more particularly, to a light sensing circuit for use in automatic brightness control and a flat panel display including the light sensing circuit.

2. Description of the Related Art

After the development of CRTs, various flat panel displays such as PDPs, LCDs, and OLEDs have been developed and widely used. These flat panel displays are used in various products such as TVs, computer monitors, cellular phone screens, etc.

However, flat panel displays used as the screens of products, such as TVs or computer monitors, may not be properly viewed according to the brightness levels of the surrounding environment. For example, if such a product displays images with normal brightness in dark places, the screen thereof is too bright for users to open their eyes. On the other hand, if such a product displays images with normal brightness in bright places, users think that the screen of the product is too dark.

To address this problem, auto brightness control is applied to flat panel displays in recent years. In auto brightness control, the brightness of a surrounding environment where a flat panel display is used is detected, and the brightness of images displayed on the flat panel display is adjusted according to the detected brightness of the surrounding environment.

To accomplish such auto brightness control, a light sensing circuit is used. The light sensing circuit includes a photodiode which may generate current according to the brightness of incident light and detect the level of the brightness of the incident light according to the current. However, the photodiode generates different magnitudes of currents according to not only the brightness of the incident light but also an ambient temperature.

FIG. 1 is a graph showing a current that flows in a photodiode included in an existing light sensing circuit. In FIG. 1, the current was measured at 25° C. and 40° C., and the brightnesses of light incident upon the photodiode at 25° C. and 40° C. were both 0 Lux. A horizontal axis of FIG. 1 represents a voltage, and a vertical axis thereof represents a current.

Referring to FIG. 1, when an identical voltage is applied to both ends of the photodiode and light with certain brightness is incident upon the photodiode, the higher the temperature is, the more current flows.

In addition, when considering each of the cases where the current was measured at 25° C. and 40° C., if the magnitude of the voltage applied to the both ends of the photodiode changes, the magnitude of the generated current changes. More specifically, as the magnitude of the voltage applied to the both ends of the photodiode increases, the magnitude of the generated current also increases.

As described above, since the current generated in the photodiode included in the existing light sensing circuit changes according to not only the brightness of incident light but also an ambient temperature, the existing light sensing circuit fails to accurately measure the brightness of a surrounding environment where a product such as a TV or a monitor is used.

Moreover, when a current is generated in the photodiode, the potential of an anode electrode or a cathode electrode of the photodiode changes according to the time, and thus the magnitude of a voltage applied to the both ends of the photodiode is changed. Accordingly, even in an identical surrounding environment, the existing light sensing circuit recognizes that the brightness of the surrounding environment changes as the time elapses.

SUMMARY OF THE INVENTION

The present invention provides a light sensing circuit capable of precisely sensing the brightness of a surrounding environment and driving a flat panel display with optimal brightness, and the flat panel display including the light sensing circuit.

According to an aspect of the present invention, there is provided a light sensing circuit including: a first sensing circuit which generates a current according to incident light and an ambient temperature; and a second sensing circuit which generates a current according to the ambient temperature, wherein each of the first sensing circuit and the second sensing circuit includes a photodiode; an OP (operational) amplifier connected to the photodiode; and an analog-to-digital converter (ADC) which measures a current generated in the photodiode and converts the current into a digital value.

In at least one of the first sensing circuit and the second sensing circuit, a first input terminal of the OP amplifier may be connected to the photodiode, a reference voltage may be applied to a second input terminal of the OP amplifier, and an output terminal of the OP amplifier may be connected to the ADC.

The at least one of the first sensing circuit and the second sensing circuit may further include a capacitor connected between the first input terminal of the OP amplifier and the output terminal of the OP amplifier; and a switch connected between the first input terminal of the OP amplifier and the output terminal of the OP amplifier.

In the at least one of the first sensing circuit and the second sensing circuit, the reference voltage may be applied to the first input terminal of the OP amplifier, and the second input terminal of the OP amplifier may be connected to the photodiode.

The at least one of the first sensing circuit and the second sensing circuit may further include a transistor including a first electrode connected to the photodiode, a second electrode connected to the ADC, and a gate electrode connected to the output terminal of the OP amplifier; and a switch connected to the photodiode.

The light sensing circuit may further include a calculation unit which receives digital values obtained by the ADCs of the first and second sensing circuits and measures the brightness of the incident light.

According to another aspect of the present invention, there is provided a light sensing circuit including a first photodiode; a second photodiode which is electrically connected to the first photodiode and includes a shielding film for shielding externally incident light; a first voltage fixing unit which is connected to the first photodiode and the second photodiode and maintains a voltage applied to the first photodiode at a certain value; and an ADC which generates a digital value that depends on a current flowing in the first photodiode and the second photodiode.

The first voltage fixing unit may include a first OP amplifier including a first input terminal to which the reference voltage is applied, a second input terminal connected to the first photodiode, and an output terminal; and a first transistor including a first electrode connected to the first photodiode, a second electrode connected to the ADC, and a gate electrode connected to the output terminal of the OP amplifier.

The first voltage fixing unit may further include a first switch which is connected to the first photodiode and applies the reference voltage to the first photodiode.

The first voltage fixing unit may include a second OP amplifier including a first input terminal connected to the first photodiode, a second input terminal to which the reference voltage is applied, and an output terminal; and a first capacitor including a first electrode connected to the first input terminal of the second OP amplifier and a second electrode connected to the output terminal of the second OP amplifier.

The first voltage fixing unit may further include a second switch which is connected between the first electrode and the second electrode of the capacitor and short-circuits the capacitor; and a third switch which is connected to the first photodiode and applies the reference voltage to the first photodiode.

The light sensing circuit may further include a second voltage fixing unit which constantly maintains a voltage applied to the second photodiode.

The second voltage fixing unit may include a third OP amplifier including a first input terminal connected to the second photodiode, a second input terminal to which the reference voltage is applied, and an output terminal; and a second transistor including a first electrode connected to the second photodiode, a second electrode connected to the first photodiode, and a gate electrode connected to the output terminal of the third OP amplifier.

The second voltage fixing unit may further include a fourth switch connected to the second photodiode.

According to another aspect of the present invention, there is provided a flat panel display including a plurality of pixels; a light sensing circuit which senses the brightness of externally incident light; a plurality of driving units which drive the plurality of pixels; and a controller which controls the driving units and controls the brightness of data displayed on the plurality of pixels according to the light brightness sensed by the light sensing circuit.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings, in which exemplary embodiments of the invention are shown.

Figure 1:
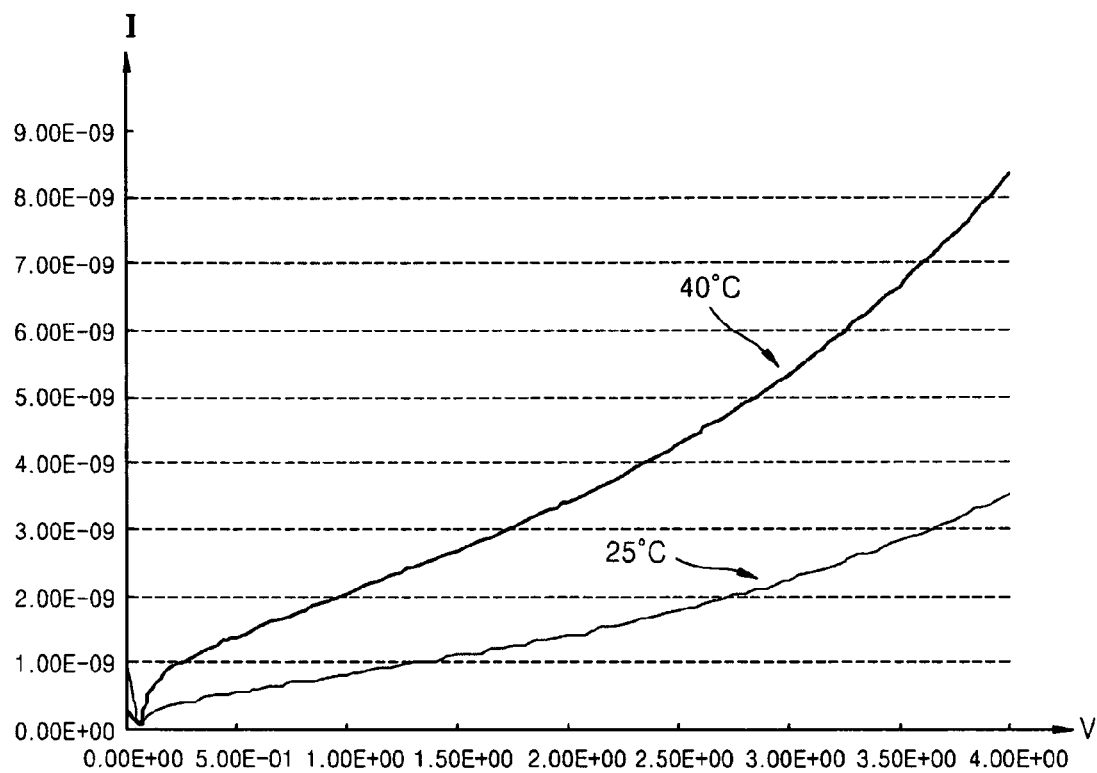
FIG. 1 is a graph showing a current that flows in a photodiode included in an existing light sensing circuit.
Figure 2:
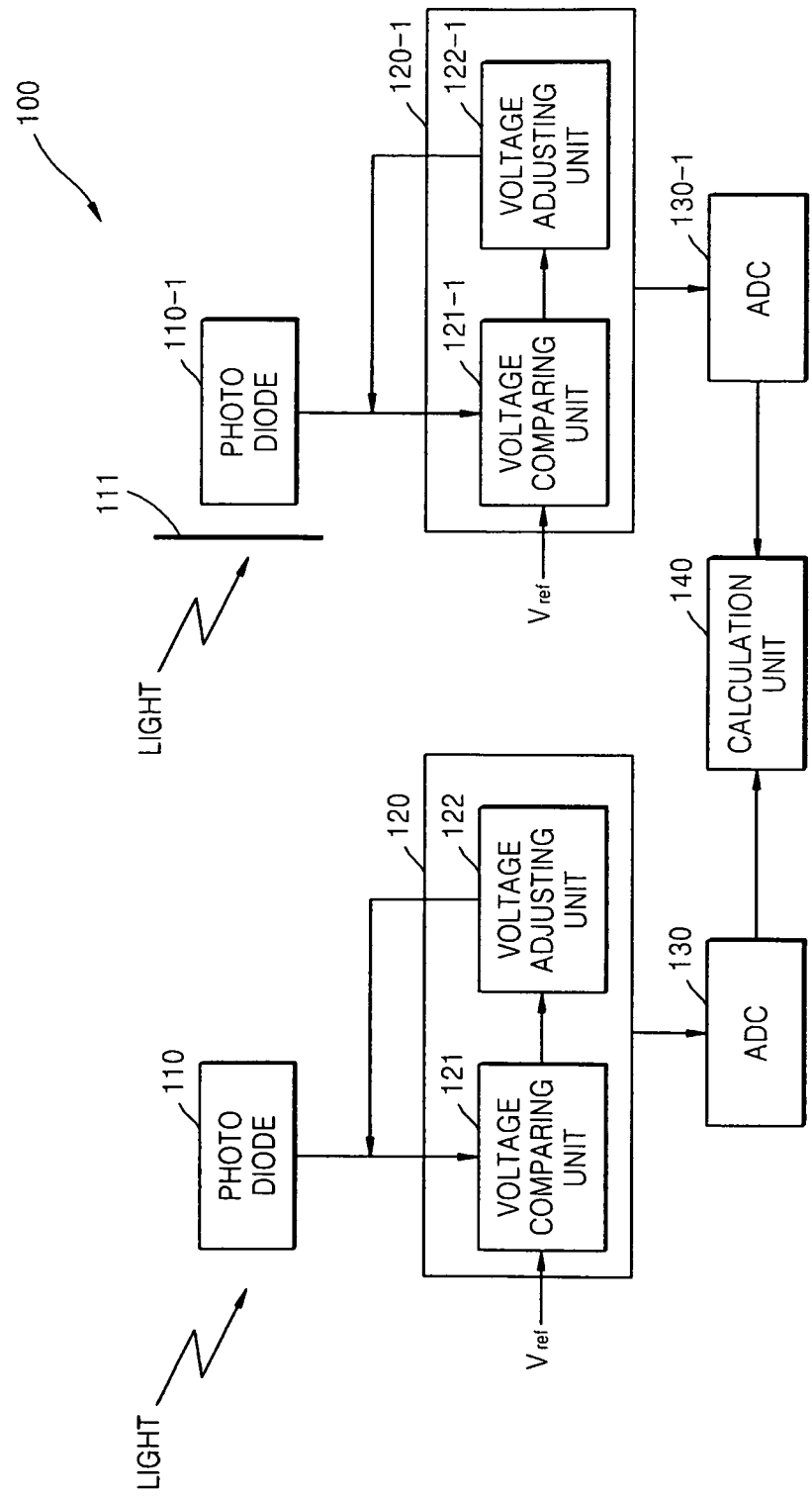
FIG. 2 is a block diagram of a light sensing circuit according to an embodiment of the present invention.

FIG. 2 is a block diagram of a light sensing circuit 100 according to an embodiment of the present invention.

Referring to FIG. 2, the light sensing circuit 100 includes a first sensing circuit and a second sensing circuit. The first sensing circuit and the second sensing circuit may include photodiodes 110 and 110-1, respectively, voltage fixing units 120 and 120-1, respectively, and analog-to-digital converters (ADCs) 130 and 130-1, respectively, and share a calculation unit 140.

The photodiode 110 generates a current according to a brightness of externally incident light and an ambient temperature. The photodiode 110-1 further includes a shielding film 111 in order to shield the externally incident light. Accordingly, the photodiode 110-1 generates a current which depends on only the ambient temperature.

The voltage fixing units 120 and 120-1 fix voltages applied to the photodiodes 110 and 110-1 to certain values. The voltage fixing units 120 and 120-1 include voltage comparing units 121 and 121-1, respectively, and voltage adjusting units 122 and 122-1, respectively.

The voltage comparing units 121 and 121-1 receive a reference voltage $V_{ref}$ and voltages of anode electrodes of the photodiodes 110 and 110-1, respectively, and compare the reference voltage $V_{ref}$ with the voltage of the anode electrode of the photodiode 110 and the reference voltage $V_{ref}$ with the voltage of the anode electrode of the photodiode 110-1, respectively. Output voltages corresponding to results of the comparisons are applied to the voltage adjusting units 122 and 122-1, respectively.

The voltage adjusting units 122 and 122-1 receive the output voltages of the voltage comparing units 121 and 121-1, respectively, and adjust the received voltages so that the voltages of the anode electrodes of the photodiodes 110 and 110-1 are equal to the reference voltage $V_{ref}$.

The ADCs 130 and 130-1 receive voltage or current values depending on the currents generated in the photodiodes 110 and 110-1, respectively, and convert the received voltage or current values into digital values. The ADCs 130 and 130-1 are connected to the voltage fixing units 120 and 120-1, respectively.

The calculation unit 140 receives the digital value output from the ADC 130 and the digital value output from the ADC 130-1 and calculates the brightness of the externally incident light.

Embodiments of the light sensing circuit 100 of FIG. 2 will now be described with reference to FIGS. 3 and 4.

Figure 3:
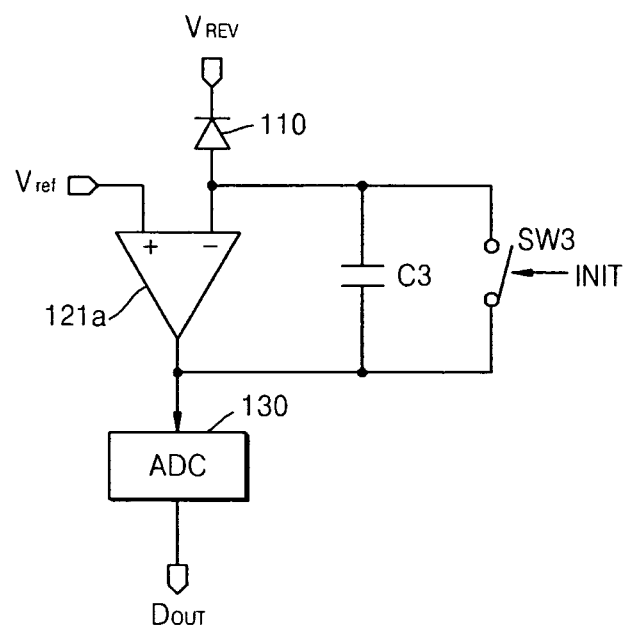
FIG. 3 is a circuit diagram of the light sensing circuit of FIG. 2, according to an embodiment of the present invention.

FIG. 3 is a circuit diagram of the light sensing circuit 100 of FIG. 2, according to an embodiment of the present invention. The light sensing circuit of FIG. 3 may be one of the first sensing circuit and the second sensing circuit. Alternatively, the light sensing circuit of FIG. 3 may be applied to both the first sensing circuit and the second sensing circuit.

The light sensing circuit of FIG. 3 may include the photodiode 110, an OP (operational) amplifier 121a, a capacitor C3, a switch SW3, and the ADC 130.

The photodiode 110 generates a current according to the brightness of externally incident light and an ambient temperature. The reference voltage $V_{ref}$ is applied to an anode electrode of the photodiode 110, and a first voltage $V_{REV}$ is applied to a cathode electrode of the photodiode 110. The first voltage $V_{REV}$ is greater than the reference voltage $V_{ref}$. Accordingly, a reverse bias voltage is applied to the photodiode 110. The reference voltage $V_{ref}$ may be a ground voltage.

The OP amplifier 121a, which is an embodiment of a voltage comparing unit, includes an inverting input terminal, a non-inverting input terminal, and an output terminal. The inverting input terminal of the OP amplifier 121a is connected to the anode electrode of the photodiode 110, and the output terminal thereof is connected to the ADC 130. The reference voltage $V_{ref}$ is applied to the non-inverting input terminal of the OP amplifier 121a.

The OP amplifier 121a compares the reference voltage $V_{ref}$ with the voltage of the anode electrode of the photodiode 110, and outputs as an output voltage a value corresponding to a difference between the two voltages.

The capacitor C3, which is an embodiment of a voltage adjusting unit, includes a first electrode and a second electrode. The first electrode of the capacitor C3 is connected to the inverting input terminal of the OP amplifier 121a, and the second electrode of the capacitor C3 is connected to the output terminal of the OP amplifier 121a.

As the output voltage of the OP amplifier 121a, which is output via the output terminal, changes, the capacitor C3 shifts a voltage of the second electrode in order to constantly maintain a voltage between the first electrode and the second electrode of the capacitor C3.

Switch SW3 is connected between the first and second electrodes of the capacitor C3. When the switch SW3 is turned on by an initiation signal INIT, the capacitor C3 is short-circuited.

The ADC 130 generates a digital value corresponding to the current generated in the photodiode 110. More specifically, the ADC 130 is connected to the output terminal of the OP amplifier 121a and accordingly receives the output voltage from the OP amplifier 121a and generates the digital value into which the output voltage is converted from an analog value.

In an operation of the light sensing circuit of FIG. 3, when light is externally incident upon the photodiode 110, a current is generated in the photodiode 110. The current flows from the cathode electrode of the photodiode 110 to the anode electrode thereof.

The current increases the voltage of the anode electrode of the photodiode 110. Due to the increase in the voltage of the anode electrode, a voltage applied to the non-inverting input terminal of the OP amplifier 121a may be greater than that applied to the inverting input terminal thereof. Thus, the output voltage of the output terminal of the OP amplifier 121a is decreased, and the capacitor C3 shifts the voltage of the first electrode thereof in order to maintain the voltage between the inverting input terminal and the output terminal of the OP amplifier 121a.

Accordingly, the cathode electrode of the photodiode 110 is maintained to have the first voltage $V_{REV}$, and the anode electrode thereof is maintained to have the reference voltage $V_{ref}$.

When the light sensing circuit detects the brightness of periodically incident light, the initiation signal INIT is applied to the switch SW3 to turn on the switch SW3. Thus, not only the voltage of the anode electrode of the photodiode 110 but also the voltage of the output terminal of the OP amplifier 121a may be initiated to the reference voltage $V_{ref}$.

In the light sensing circuit of FIG. 3, the reference voltage $V_{ref}$ is applied to the anode electrode of the photodiode 110, and the first voltage $V_{REV}$ is applied to the cathode electrode thereof. However, the present invention is not limited to this embodiment. In other words, the structure of the photodiode 110 may be changed as long as a reverse bias voltage can be applied to the photodiode 110.

For example, a second voltage $-V_{REV}$ may be applied to the anode electrode of the photodiode 110, and the cathode electrode may be connected to the inverting input terminal of the OP amplifier 121a.

Figure 4:
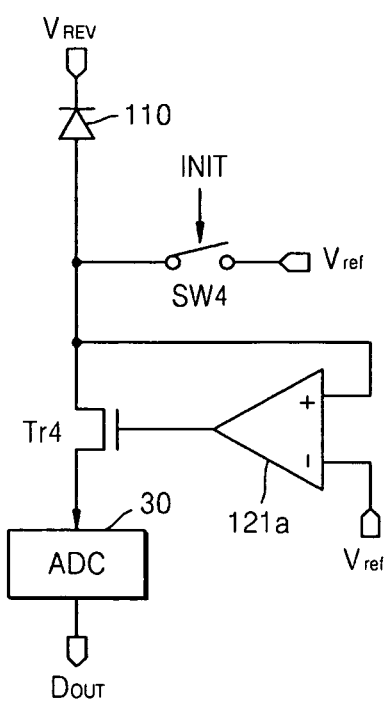
FIG. 4 is a circuit diagram of the light sensing circuit of FIG. 2, according to another embodiment of the present invention.

FIG. 4 is a circuit diagram of the light sensing circuit 100 of FIG. 2, according to another embodiment of the present invention. The light sensing circuit of FIG. 4 may be one of the first sensing circuit and the second sensing circuit. Alternatively, the light sensing circuit of FIG. 4 may be applied to both the first sensing circuit and the second sensing circuit. The light sensing circuit of FIG. 4 will now be described by focusing on differences from the light sensing circuit of FIG. 3, and a description of the same elements as those of FIG. 3 will be omitted.

The light sensing circuit according to the current embodiment of FIG. 4 may include the photodiode 110, an OP amplifier 121a, a transistor Tr4, a switch SW4, and the ADC 130.

The OP amplifier 121a, which is an embodiment of a voltage comparing unit, includes an inverting input terminal, a non-inverting input terminal, and an output terminal. The non-inverting input terminal of the OP amplifier 121a is connected to the anode electrode of the photodiode 110, and the output terminal thereof is connected to the gate electrode of the transistor Tr4. The reference voltage $V_{ref}$ is applied to the inverting input terminal of the OP amplifier 121a.

The transistor Tr4, which is an embodiment of a voltage adjusting unit, includes a first electrode, a second electrode, and a gate electrode. The first electrode of the transistor Tr4 is connected to the anode electrode of the photodiode 110, the second electrode thereof is connected to the ADC 130, and the gate electrode thereof is connected to the output terminal of the OP amplifier 121a.

The transistor Tr4 is turned on or off according to an output voltage of the OP amplifier 121a, which is received via the gate electrode of the transistor Tr4, and thus controls the voltage of the anode electrode of the photodiode 110 to have a constant level.

Switch SW4 is connected between the anode electrode of the photodiode 110 and a source of the reference voltage $V_{ref}$. When the switch SW4 is turned on by the initiation signal INIT, voltages applied to the anode electrode of the photodiode 110 and the non-inverting input terminal of the OP amplifier 121a are initiated. Although in the present embodiment the switch SW4 is connected to the anode electrode of the photodiode 110 and the source of the reference voltage $V_{ref}$, the present invention is not limited thereto. The light sensing circuit may have another structure as long as it allows the voltage applied to the photodiode 110 to be initialized. For example, the light sensing circuit may have a structure in which the switch SW4 is connected between the first electrode and the second electrode of the transistor Tr4.

In an operation of the light sensing circuit of FIG. 4, when external light is incident upon the photodiode 110, a current is generated in the photodiode 110. The generated current flows from the cathode electrode of the photodiode 110 to the anode electrode thereof.

A voltage of the anode electrode of the photodiode 110 is increased by the current. Due to the increase in the voltage of the anode electrode, a voltage applied to the non-inverting input terminal of the OP amplifier 121a is greater than that applied to the inverting input terminal thereof. Thus, an output voltage of the OP amplifier 121a, which is output through the output terminal, is increased. Since the output voltage is applied to the gate electrode of the transistor Tr4, the transistor Tr4 is turned on.

As the transistor Tr4 is turned on, an electric charge moving toward the anode electrode of the photodiode 110 is supplemented, that is, the current generated in the photodiode 110 is flowed to the ADC 130. Thus, the voltage of the anode electrode of the photodiode 110 is maintained constantly, that is, at the reference voltage $V_{ref}$.

When the light sensing circuit senses the brightness of periodically incident light, not only the voltage of the anode electrode of the photodiode 110 but also the voltage of the output terminal of the OP amplifier 121a may be initialized by applying the initiation signal INIT to the switch SW4 and thus turning on the switch SW4.

Similar to the light sensing circuit of FIG. 3, it is illustrated in the light sensing circuit of FIG. 4 that the reference voltage $V_{ref}$ is applied to the anode electrode of the photodiode 110 and the first voltage $V_{REV}$ is applied to the cathode electrode thereof. However, the present invention is not limited to this embodiment. In other words, the structure of the photodiode 110 may be changed as long as the reverse bias voltage can be applied to the photodiode 110.

For example, the second voltage $-V_{REV}$ may be applied to the anode electrode of the photodiode 110, and the cathode electrode of the photodiode 110 may be connected to the inverting input terminal of the OP amplifier 121a. In this case, the reference voltage $V_{ref}$ may be applied to the non-inverting input terminal of the OP amplifier 121a.

Although not shown in FIGS. 3 and 4, when the light sensing circuit of FIG. 3 or 4 is applied to the second sensing circuit of the light sensing circuit 100 of FIG. 2, the light sensing circuit of FIG. 3 or 4 further includes a shielding film 111 which shields light from being incident upon the photodiode 110.

As described above, a light sensing circuit according to the present invention can more precisely sense the brightness of surrounding environment by calculating the brightness in consideration of a current that only depends on an ambient temperature. In addition, a current is generated while a voltage applied between both ends of a photodiode is maintained constantly, is whereby a sensing operation of the light sensing circuit is reliable.

Figure 5:
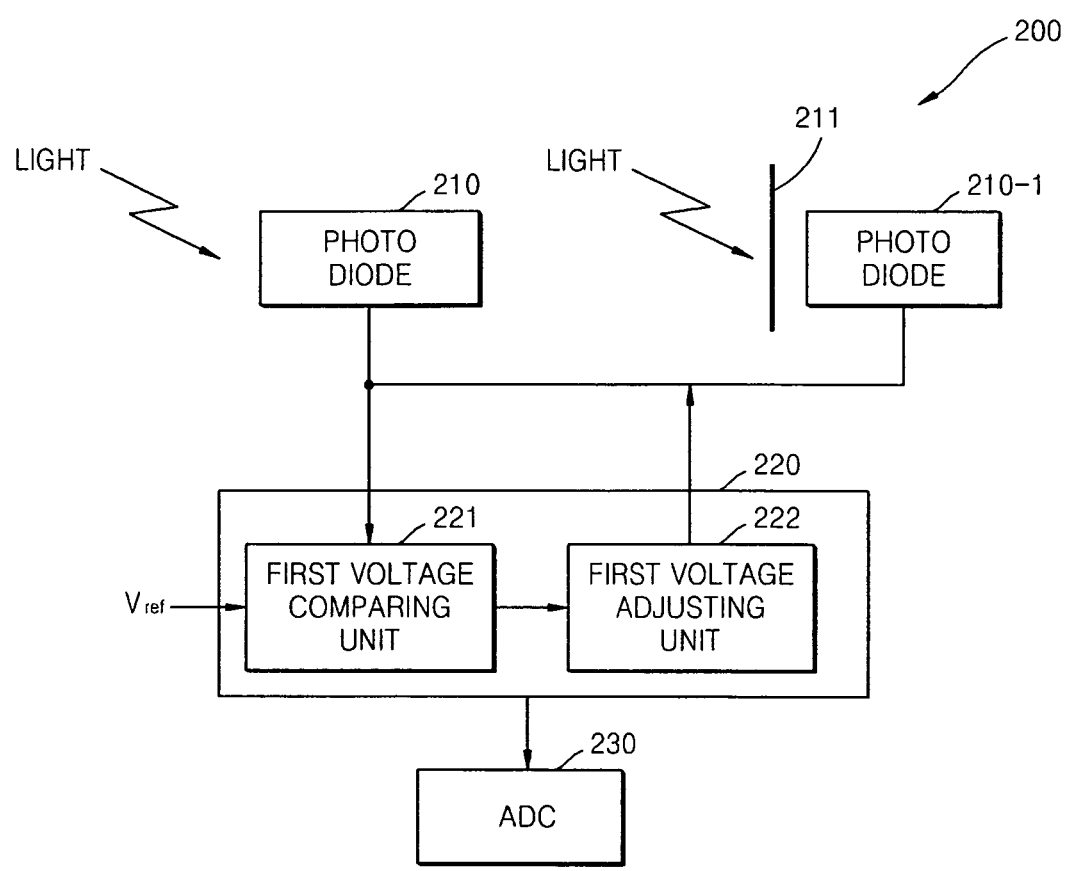
FIG. 5 is a block diagram of a light sensing circuit according to another embodiment of the present invention.

FIG. 5 is a block diagram of a light sensing circuit 200 according to another embodiment of the present invention. Referring to FIG. 5, the light sensing circuit 200 includes two photodiodes 210 and 210-1, a first voltage fixing unit 220, and an ADC 230.

Among the two photodiodes 210 and 210-1, the photodiode 210 generates a current according to the brightness of externally incident light and an ambient temperature. On the other hand, since the photodiode 210-1 further includes a shielding film 211 for shielding externally incident light, the photodiode 210-1 generates a current that depends upon only the ambient temperature. For convenience sake, the photodiode 210 having no shielding films is referred to as a first photodiode 210, and the photodiode 210-1 having the shielding film 211 is referred to as a second photodiode 210-1.

The first voltage fixing unit 220 fixes a voltage of an anode electrode of the first photodiode 210 and a voltage of a cathode electrode of the second photodiode 210-1 to certain voltage values. The first voltage fixing unit 220 includes a first voltage comparing unit 221 and a first voltage adjusting unit 222.

The first voltage comparing unit 221 receives a reference voltage $V_{ref}$ and the voltage of the anode electrode of the first photodiode 210 and compares the two voltages with each other. An output voltage corresponding to a result of the comparison is applied to the first voltage adjusting unit 222.

The first voltage adjusting unit 222 receives the output voltage from the first voltage comparing unit 221 and adjusts the voltage of the anode electrode of the first photodiode 210 so as to be equal to the reference voltage $V_{ref}$.

The ADC 230 receives voltage or current values depending on currents generated in the first photodiode 210 and the second photodiode 210-1, and converts the voltage or current values into digital values. The ADC 230 is connected to the first voltage fixing unit 220.

Embodiments of the light sensing circuit 200 of FIG. 5 will now be described with reference to FIGS. 6 and 7.

Figure 6:
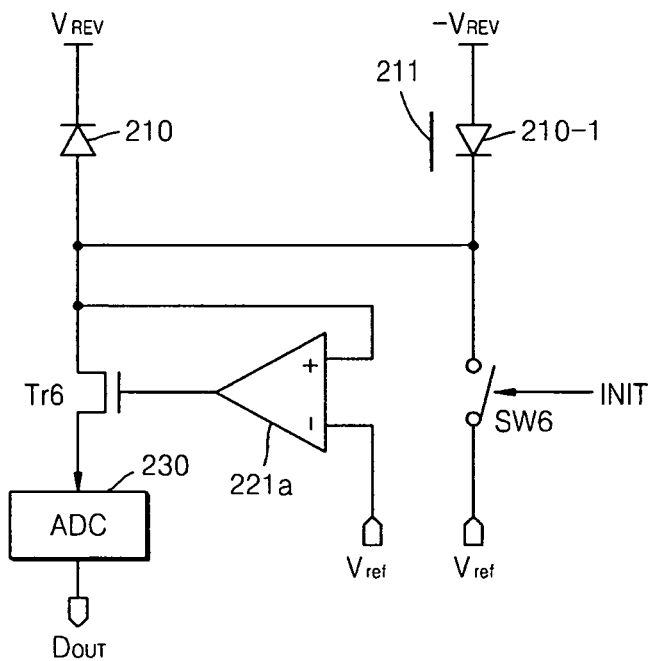
FIG. 6 is a circuit diagram of the light sensing circuit of FIG. 5, according to an embodiment of the present invention.

FIG. 6 is a circuit diagram of the light sensing circuit 200 of FIG. 5, according to an embodiment of the present invention.

The light sensing circuit of FIG. 6 may include a first photodiode 210, a second photodiode 210-1, a shielding film 211, an OP amplifier 221a, a transistor Tr6, a switch SW6, and an ADC 230.

The first photodiode 210 generates a current according to the brightness of externally incident light and an ambient temperature. The reference voltage $V_{ref}$ is applied to the anode electrode of the first photodiode 210, and the first voltage $V_{REV}$ is applied to the cathode electrode thereof. Since the first voltage $V_{REV}$ is greater than the reference voltage $V_{ref}$, a reverse bias voltage is applied to the first photodiode 210.

The second photodiode 210-1, shielded from external incident light by shielding film 211, generates a current that depends upon only the ambient temperature. The second voltage $-V_{REV}$ is applied to the anode electrode of the second photodiode 210-1, and the reference voltage $V_{ref}$ is applied to the cathode electrode thereof. The second voltage $-V_{REV}$ has the same magnitude as the first voltage $V_{REV}$ and a polarity opposite to that of the first voltage $V_{REV}$. Therefore, a reverse bias voltage having the same magnitude as that applied to the first photodiode 210 is applied to the second photodiode 210-1.

The OP amplifier 221a, which is an embodiment of the first voltage comparing unit 221, includes an inverting input terminal, a non-inverting input terminal, and an output terminal. The non-inverting input terminal of the OP amplifier 221a is connected to the anode electrode of the first photodiode 210, and the output terminal thereof is connected to a gate electrode of the transistor Tr6. The reference voltage $V_{ref}$ is applied to the inverting input terminal of the OP amplifier 221a.

The OP amplifier 221a compares the reference voltage $V_{ref}$ with the voltage of the anode electrode of the first photodiode 210 and outputs as an output voltage a value corresponding to a difference between the two voltages.

The transistor Tr6, which is an embodiment of the first voltage adjusting unit 222, includes a first electrode, a second electrode, and a gate electrode. The first electrode of the transistor Tr6 is connected to the anode electrode of the first photodiode 210, the second electrode thereof is connected to the ADC 230, and the gate electrode thereof is connected to the output terminal of the OP amplifier 221a.

The transistor Tr6 is turned on or off according to the output voltage of the OP amplifier 221a, which is received via the gate electrode, and thus adjusts each of the voltages of the anode electrode of the first photodiode 210 and the cathode electrode of the second photodiode 210-1 to be constant.

The switch SW6 is connected between a source of the reference voltage $V_{ref}$ and the anode electrode of the first photodiode 210, the cathode electrode of the second photodiode 210-1 and the non-inverting input terminal of the OP amplifier 221a. When the switch SW6 is turned on by the initiation signal INIT, the voltages applied to the anode electrode of the first photodiode 210, the cathode electrode of the second photodiode 210-1, and the non-inverting input terminal of the OP amplifier 221a are initialized.

Although it is illustrated in the present embodiment that the switch SW6 is connected between the anode electrode of the first photodiode 210 and the source of the reference voltage $V_{ref}$, the present invention is not limited thereto. The light sensing circuit may have another structure as long as it allows the voltage applied to the photodiode 210 to be initialized. For example, the light sensing circuit may have a structure in which the switch SW6 is connected between the first electrode and the second electrode of the transistor Tr6.

The ADC 230 generates a digital value corresponding to a current generated in the first photodiode 210 and the second photodiode 210-1. More specifically, the ADC 230 is connected to the second electrode of the transistor Tr6 and thus a current flows from the anode electrode of the first photodiode to the ADC 230 when the transistor Tr6 is turned on. The ADC 230 generates a digital value into which the current is converted from an analog value.

In an operation of the light sensing circuit of FIG. 6, when external light is incident upon the first photodiode 210, a first current which depends on the brightness of the incident light and an ambient temperature is generated in the first photodiode 210. The first current flows from the cathode electrode of the first photodiode 210 to the anode electrode thereof.

At the same time, a second current that depends on only the ambient temperature is generated in the second photodiode 210-1. The second current flows from the cathode electrode of the second photodiode 210-1 to the anode electrode thereof. Since the first current is generated according to the incident light and the ambient temperature, the magnitude of the first current is greater than that of the second current.

A current corresponding to the second current from among the first current flows toward the second photodiode 210-1. Accordingly, the voltage of the anode electrode of the first photodiode 210 is increased by a current with a magnitude obtained by subtracting the second current from the first current.

Due to the increase in the voltage of the anode electrode of the first photodiode 210, a voltage applied to the non-inverting input terminal of the OP amplifier 221a is greater than that applied to the inverting input terminal thereof. Accordingly, the output voltage output through the output terminal of the OP amplifier 221a is increased. Since the output voltage is applied to the gate electrode of the transistor Tr6, the transistor Tr6 is turned on.

As the transistor Tr6 is turned on, an electric charge moving toward the anode electrode of the first photodiode 210 is supplemented, that is, the current of the magnitude obtained by subtracting the second current from the first current is flowed to the ADC 130. Thus, the voltage of the anode electrode of the first photodiode 210 is maintained constantly, that is, at the reference voltage $V_{ref}$.

When the light sensing circuit senses the brightness of periodically incident light, not only voltage of the anode electrode of the first photodiode 210 but also the voltages of the cathode electrode of the second photodiode 210-1 and the output terminal of the OP amplifier 221a may be initialized by applying the initiation signal INIT to the switch SW6 and thus turning on the switch SW6.

It is illustrated in the light sensing circuit of FIG. 6 that the reference voltage $V_{ref}$ is applied to the anode electrode of the first photodiode 210 and the first voltage $V_{REV}$ is applied to the cathode electrode thereof and that the second voltage $-V_{REV}$ is applied to the anode electrode of the second photodiode 210-1 and the reference voltage $V_{ref}$ is applied to the cathode electrode thereof. However, the present invention is not limited to this embodiment. In other words, the structures of the first and second photodiodes 210 and 210-1 may be changed as long as reverse bias voltages can be applied to the first and second photodiodes 210 and 210-1.

For example, the second voltage $-V_{REV}$ may be applied to the anode electrode of the first photodiode 210, and the cathode electrode of the first photodiode 210 may be connected to the inverting input terminal of the OP amplifier 221a. In this case, the reference voltage $V_{ref}$ may be applied to the non-inverting input terminal of the OP amplifier 221a.

When the structure of the first photodiode 210 is changed as described above, the first voltage $V_{REV}$ may be applied to the cathode electrode of the second photodiode 210-1, and the anode electrode of the second photodiode 210-1 may be connected to the first photodiode 210.

Figure 7:
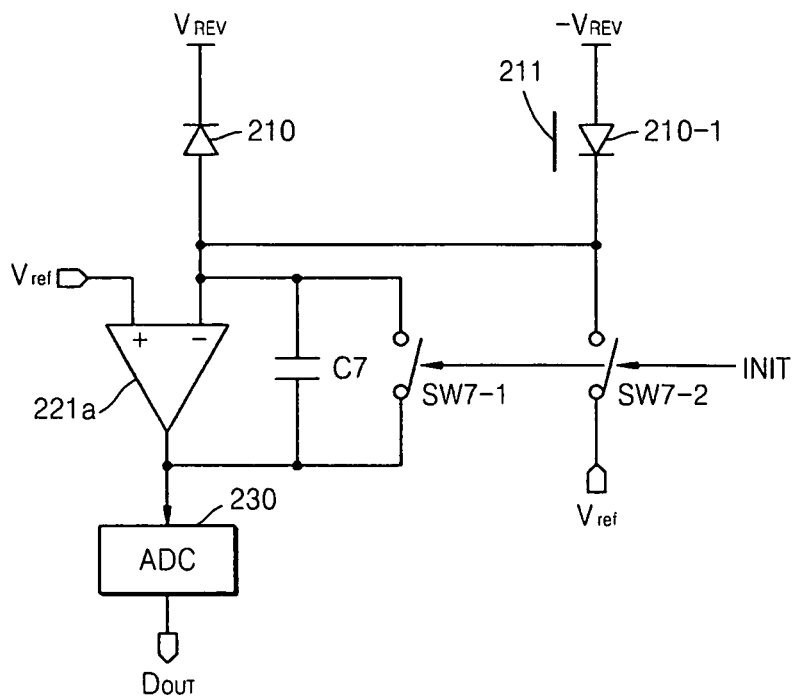
FIG. 7 is a circuit diagram of the light sensing circuit of FIG. 5, according to another embodiment of the present invention.

FIG. 7 is a circuit diagram of the light sensing circuit 200 of FIG. 5, according to another embodiment of the present invention. The light sensing circuit of FIG. 7 will now be described by focusing on differences from the light sensing circuit of FIG. 6, and a description of the same elements as those in FIG. 6 will be omitted.

The light sensing circuit of FIG. 7 may include a first photodiode 210, a second photodiode 210-1, a shielding film 211, an OP amplifier 221a, a capacitor C7, a first switch SW7-1, a second switch SW7-2, and an ADC 230.

The first photodiode 210, the second photodiode 210-1, and the shielding film 211 have the same structures as those in the light sensing circuit of FIG. 6, so a detailed description of thereof will be omitted.

The OP amplifier 221a, which is another embodiment of the first voltage comparing unit 221, includes an inverting input terminal, a non-inverting input terminal, and an output terminal. The inverting input terminal of the OP amplifier 221a is connected to the anode electrode of the first photodiode 210, and the output terminal thereof is connected to the ADC 230. The reference voltage $V_{ref}$ is applied to the non-inverting input terminal of the OP amplifier 221a.

The OP amplifier 221a compares the reference voltage $V_{ref}$ with the voltage of the anode electrode of the first photodiode 210, and outputs as an output voltage a value corresponding to a difference between the two voltages.

The capacitor C7, which is another embodiment of the first voltage adjusting unit 222, includes a first electrode and a second electrode. The first electrode of the capacitor C7 is connected to the inverting input terminal of the OP amplifier 221a, and the second electrode thereof is connected to the output terminal of the OP amplifier 221a.

As the output voltage of the output terminal of the OP amplifier 221a varies, the capacitor C7 shifts the voltage of the second electrode in order to constantly maintain a voltage between the first and second electrodes of the capacitor C7.

The first switch SW7-1 is connected between the first electrode and the second electrode of the capacitor C7. When the first switch SW7-1 is turned on by the initiation signal INIT, the capacitor C7 is short-circuited.

The second switch SW7-2 is connected between a source of the reference voltage $V_{ref}$ and the anode electrode of the first photodiode 210, the cathode electrode of the second photodiode 210-1 and the non-inverting input terminal of the OP amplifier 221a. When the second switch SW7-2 is turned on by the initiation signal INIT, voltages applied to the anode electrode of the first photodiode 210 and the cathode electrode of the second photodiode 210-1 are initialized.

The ADC 230 generates a digital value corresponding to a current generated in the first photodiode 210 and the second photodiode 210-1. More specifically, the ADC 230 is connected to the output terminal of the OP amplifier 221a and thus receives the output voltage from the OP amplifier 221a and generates a digital value into which the output voltage is converted from an analog value.

In an operation of the light sensing circuit of FIG. 7, similar to the light sensing circuit of FIG. 6, a first current that depends on externally incident light and an ambient temperature is generated in the first photodiode 210, and a second current that depends on only the ambient temperature is generated in the second photodiode 210-1. A voltage of the anode electrode of the first photodiode 210 is increased by a current of a magnitude corresponding to a value obtained by subtracting the second current from the first current.

Due to the increase in the voltage of the anode electrode of the first photodiode 210, a voltage applied to the inverting input terminal of the OP amplifier 221a is greater than that applied to the non-inverting input terminal thereof. Thus, an output voltage of the OP amplifier 221a, which is output through the output terminal, is decreased, and the capacitor C7, which is connected between the inverting input terminal and the output terminal of the OP amplifier 221a, shifts a voltage of the first electrode in order to constantly maintain the voltage between the first and second electrodes of the capacitor C7.

Thus, the cathode electrode of the first photodiode 210 is maintained to constantly have the first voltage $V_{REV}$, and the anode electrode thereof is maintained to constantly have the reference voltage $V_{ref}$. The anode electrode of the second photodiode 210-1 is maintained to constantly have the second voltage $-V_{REV}$, and the cathode electrode thereof is maintained to constantly have the reference voltage $V_{ref}$.

When the light sensing circuit senses the brightness of periodically incident light, not only the voltage of the anode electrode of the first photodiode 210 but also the voltage of the output terminal of the OP amplifier 221a may be initialized by applying the initiation signal INIT to the first switch SW7-1 and thus turning on the switch SW7-1.

Not only the anode electrode of the first photodiode 210 but also the cathode electrode of the second photodiode 210-1 may be initialized by applying the initiation signal INIT to the second switch SW7-2 and thus turning on the switch SW7-2.

Similar to the light sensing circuit of FIG. 6, it is illustrated in the light sensing circuit of FIG. 7 that the reference voltage $V_{ref}$ is applied to the anode electrode of the first photodiode 210 and the first voltage $V_{REV}$ is applied to the cathode electrode thereof and that the second voltage $-V_{REV}$ is applied to the anode electrode of the second photodiode 210-1 and the reference voltage $V_{ref}$ is applied to the cathode electrode thereof. However, the present invention is not limited to this embodiment. In other words, the structures of the first and second photodiodes 210 and 210-1 may be changed as long as inverse bias voltages can be applied to the first and second photodiodes 210 and 210-1.

For example, the second voltage $-V_{REV}$ may be applied to the anode electrode of the first photodiode 210, and the cathode electrode of the first photodiode 210 may be connected to the inverting input terminal of the OP amplifier 221a.

In this case, the first voltage $V_{REV}$ may be applied to the cathode electrode of the second photodiode 210-1, and the anode electrode of the second photodiode 210-1 may be connected to the first photodiode 210.

As described above, a light sensing circuit according to the present invention can more precisely sense the brightness of surrounding environment by calculating the brightness in consideration of a current that only depends on an ambient temperature. In addition, a current is generated while a voltage applied between both ends of a photodiode is maintained constantly, whereby a sensing operation of the light sensing circuit is reliable.

Figure 8:
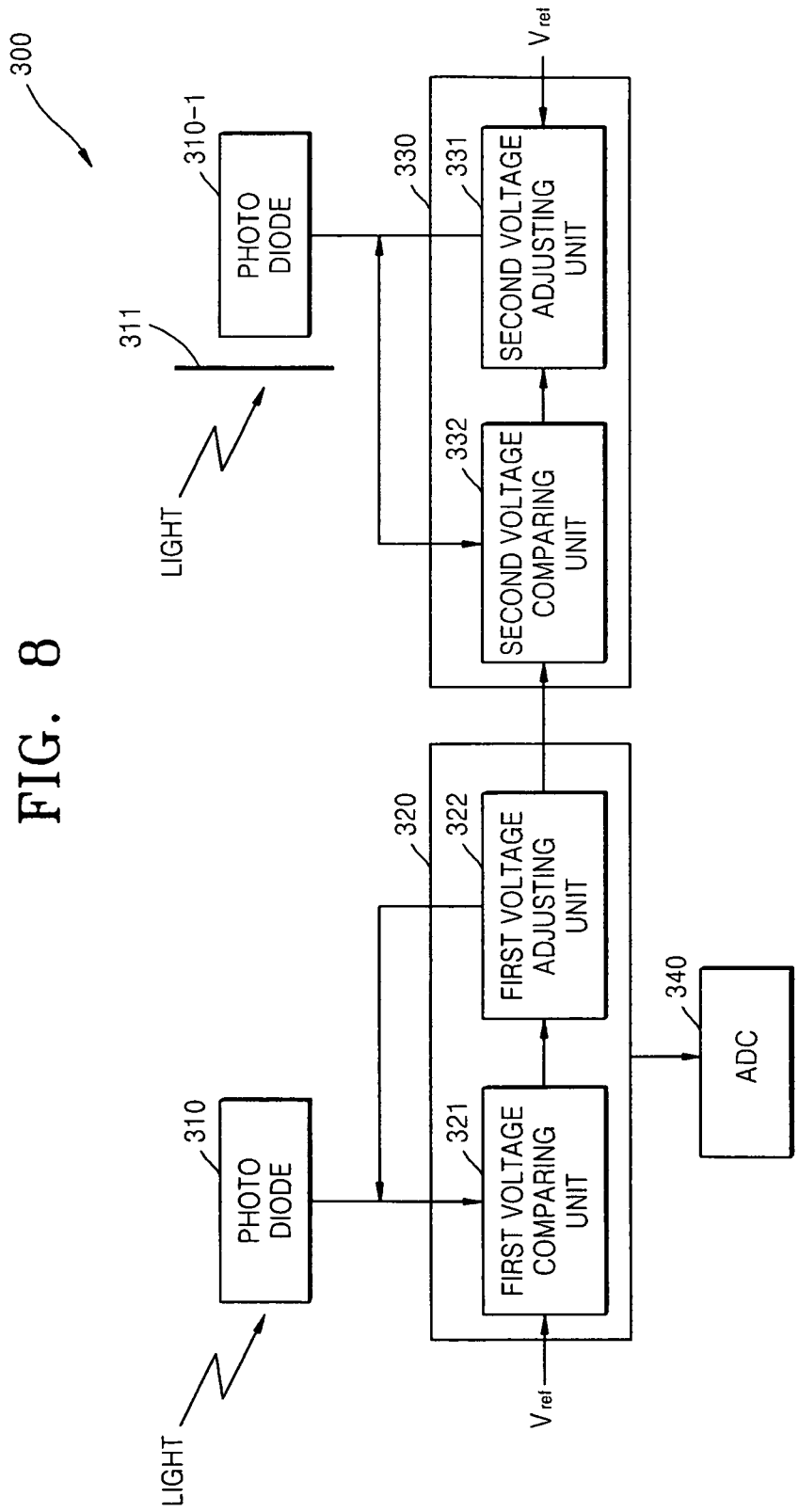
FIG. 8 is a block diagram of a light sensing circuit according to another embodiment of the present invention.

FIG. 8 is a block diagram of a light sensing circuit 300 according to another embodiment of the present invention. Referring to FIG. 8, the light sensing circuit 300 includes a first photodiode 310, a second photodiode 310-1, a shielding film 311, a first voltage fixing unit 320, a second voltage fixing unit 330, and an ADC 340.

The first photodiode 310, the second photodiode 310-1, and the shielding film 311 may have the same structures as those in the light sensing circuit of FIG. 5, so a detailed description thereof will be omitted.

The first voltage fixing unit 320 fixes a voltage of an anode electrode of the first photodiode 310 to a certain voltage value. The first voltage fixing unit 320 includes a first voltage comparing unit 321 and a first voltage adjusting unit 322.

The first voltage comparing unit 321 receives the reference voltage $V_{ref}$ and the voltage of the anode electrode of the first photodiode 310 and compares the two voltages with each other. An output voltage corresponding to a result of the comparison is applied to the first voltage adjusting unit 322.

The first voltage adjusting unit 322 receives the output voltage from the first voltage comparing unit 321 and adjusts the voltage of the anode electrode of the first photodiode 310 so as to be equal to the reference voltage $V_{ref}$.

The second voltage fixing unit 330 fixes a voltage of a cathode electrode of the second photodiode 310-1 to a certain voltage value. The second voltage fixing unit 330 includes a second voltage comparing unit 332 and a second voltage adjusting unit 331.

The second voltage comparing unit 332 receives the reference voltage $V_{ref}$ and the voltage of the cathode electrode of the second photodiode 310-1 and compares the two voltages with each other. An output voltage corresponding to a result of the comparison is applied to the second voltage adjusting unit 331.

The second voltage adjusting unit 331 receives the output voltage from the second voltage comparing unit 332 and adjusts the voltage of the cathode electrode of the second photodiode 310-1 so as to be equal to the reference voltage $V_{ref}$.

The ADC 340 has the same structure and function as that in the light sensing circuit 200 of FIG. 5, so a detailed description thereof will be omitted.

Embodiments of the light sensing circuit 300 of FIG. 8 will be described with reference to FIG. 9.

Figure 9:
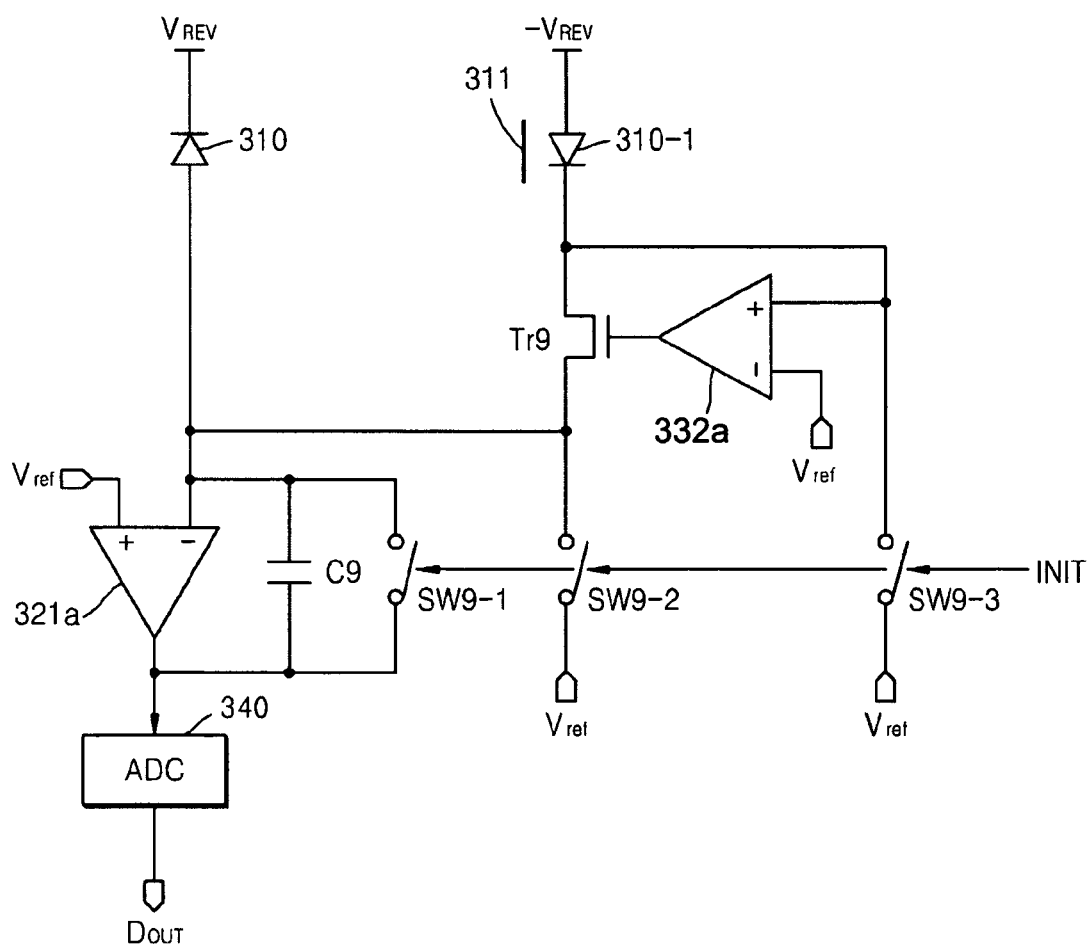
FIG. 9 is a circuit diagram of the light sensing circuit of FIG. 8, according to an embodiment of the present invention.

FIG. 9 is a circuit diagram of the light sensing circuit 300 of FIG. 8, according to an embodiment of the present invention.

Since the light sensing circuit of FIG. 9 is similar to that of FIG. 7, the light sensing circuit of FIG. 9 will be described by focusing on differences from the light sensing circuit of FIG. 7, and a description of the same elements as those in the light sensing circuit of FIG. 7 will be omitted.

The light sensing circuit of FIG. 9 may include a first photodiode 310, a second photodiode 310-1, a shielding film 311, two OP amplifiers 321a and 332a, a capacitor C9, a transistor Tr9, first, second, and third switches SW9-1, SW9-2, and SW9-3, and an ADC 340.

Among the two OP amplifiers 321a and 332a, the OP amplifier 321a connected to the first photodiode 310 is referred to as a first OP amplifier 321a, and the OP amplifier 332a connected to the second photodiode 310-1 is referred to as a second OP amplifier 332a.

The second OP amplifier 332a, which is an embodiment of the second voltage comparing unit 332, includes an inverting input terminal, a non-inverting input terminal, and an output terminal. The non-inverting input terminal of the second OP amplifier 332a is connected to a cathode electrode of the second photodiode 310-1, and the output terminal thereof is connected to a gate electrode of the transistor Tr9. The reference voltage $V_{ref}$ is applied to the inverting input terminal of the second OP amplifier 332a.

The second OP amplifier 332a compares the reference voltage $V_{ref}$ with the voltage of the cathode electrode of the second photodiode 310-1 and outputs as an output voltage a value corresponding to a difference between the two voltages.

The transistor Tr9, which is an embodiment of the second voltage adjusting unit 331, includes a first electrode, a second electrode, and a gate electrode. The first electrode of the transistor Tr9 is connected to the cathode electrode of the second photodiode 310-1, the second electrode thereof is connected to the second switch SW9-2 and the anode of the first photodiode 210, and the gate electrode thereof is connected to the output terminal of the second OP amplifier 332a.

The second switch SW9-2 is further connected between the anode of the first photodiode 210 and a source of the reference voltage $V_{ref}$, and is turned on by the initiation signal INIT.

The transistor Tr9 is turned on or off according to the output voltage of the second OP amplifier 332a, which is received via the gate electrode, and thus adjusts the voltage of the cathode electrode of the second photodiode 310-1 to be constant.

The third switch SW9-3 is connected between the cathode electrode of the second photodiode 310-1 and a source of the reference voltage $V_{ref}$. When the third switch SW9-3 is turned on by the initiation signal INIT, the voltages applied to the cathode electrode of the second photodiode 310-1 and the non-inverting input terminal of the second OP amplifier 332a are initialized.

Although it is illustrated in the present embodiment that the second and third switches SW9-2 and SW9-3 are separately installed, the present invention is not limited thereto. In other words, the second and third switches SW9-2 and SW9-3 may be integrated and connected between the first and second electrodes of the transistor Tr9. In this case, a voltage applied to the second photodiode 310-1 may be initialized due to a short-circuit between the first electrode and the second electrode of the transistor Tr9.

In an operation of the light sensing circuit of FIG. 9, similar to the light sensing circuit of FIG. 7, a first current that depends on externally incident light and an ambient temperature is generated in the first photodiode 310, and a second current that depends on only the ambient temperature is generated in the second photodiode 310-1 shielded from incident light by shielding film 211.

The first current flows from the anode electrode of the first photodiode 310 to the cathode electrode thereof. The voltage of the anode electrode of the first photodiode 310 is increased by the first current. Due to the increase in the voltage of the anode electrode of the first photodiode 310, the output voltage of the first OP amplifier 321a is decreased, and the capacitor C9, which is connected between the inverting input terminal and the output terminal of the first OP amplifier 321a, shifts a voltage of the first electrode in order to constantly maintain a voltage between the first and second electrodes of the capacitor C9.

Thus, the cathode electrode of the first photodiode 310 is maintained to constantly have the first voltage $V_{REV}$, and the anode electrode thereof is maintained to constantly have the reference voltage $V_{ref}$.

The second current flows from the cathode electrode of the second photodiode 310-1 to the anode electrode thereof. The voltage of the cathode electrode of the second photodiode 310-1 is decreased by the second current. Due to the decrease in the voltage of the cathode electrode of the second photodiode 310-1, a voltage applied to the non-inverting terminal of the second OP amplifier 332a is greater than that applied to the inverting input terminal thereof. Therefore, the output voltage of the second OP amplifier 332a, which is output via the output terminal, is increased. Since the output voltage is applied to the gate electrode of the transistor Tr9, the transistor Tr9 is turned on. As the transistor Tr9 is turned on, the voltage of the cathode electrode of the second photodiode 310-1 is maintained at the reference voltage $V_{ref}$.

The voltages of the anode electrode of the first photodiode 310, the cathode electrode of the second photodiode 310-1, and the output terminals of the first and second OP amplifiers 321a may be initialized by applying the initiation signal INIT to the first, second, and third switches SW9-1, SW9-2, and SW9-3 and thus turning on the first, second, and third switches SW9-1, SW9-2, and SW9-3.

Similar to the light sensing circuits of FIGS. 6 and 7, it is illustrated in the light sensing circuit of FIG. 9 that the reference voltage $V_{ref}$ is applied to the anode electrode of the first photodiode 310 and the first voltage $V_{REV}$ is applied to the cathode electrode thereof, and that the second voltage $-V_{REV}$ is applied to the anode electrode of the second photodiode 310-1 and the reference voltage $V_{ref}$ is applied to the cathode electrode thereof. However, the present invention is not limited to this embodiment. In other words, the structures of the first and second photodiodes 310 and 310-1 may be changed as long as reverse bias voltages can be applied to the first and second photodiodes 310 and 310-1.

For example, the second voltage $-V_{REV}$ may be applied to the anode electrode of the first photodiode 310, and the cathode electrode of the first photodiode 310 may be connected to the inverting input terminal of the first OP amplifier 321a.

In this case, the first voltage $V_{REV}$ may be applied to the cathode electrode of the second photodiode 310-1, and the anode electrode of the second photodiode 310-1 may be connected to the non-inverting input terminal of the second OP amplifier 332a. In addition, the reference voltage $V_{ref}$ may be applied to the inverting input terminal of the second OP amplifier 332a.

As described above, a light sensing circuit according to the present invention can more precisely sense the brightness of surrounding environment by calculating the brightness in consideration of a current that only depends on an ambient temperature. In addition, a current is generated while a voltage applied between both ends of a photodiode is maintained constantly, whereby a sensing operation of the light sensing circuit is reliable.

Although not shown in the drawings, each of the light sensing circuits of FIGS. 5 through 9 may further include a calculation unit for calculating the brightness of a surrounding environment by using the digital value obtained by the ADC. Alternatively, the calculation unit may be included outside the light sensing circuits of FIGS. 5 through 9. A detailed description of the calculation unit will now be described with reference to FIG. 10.

Figure 10:
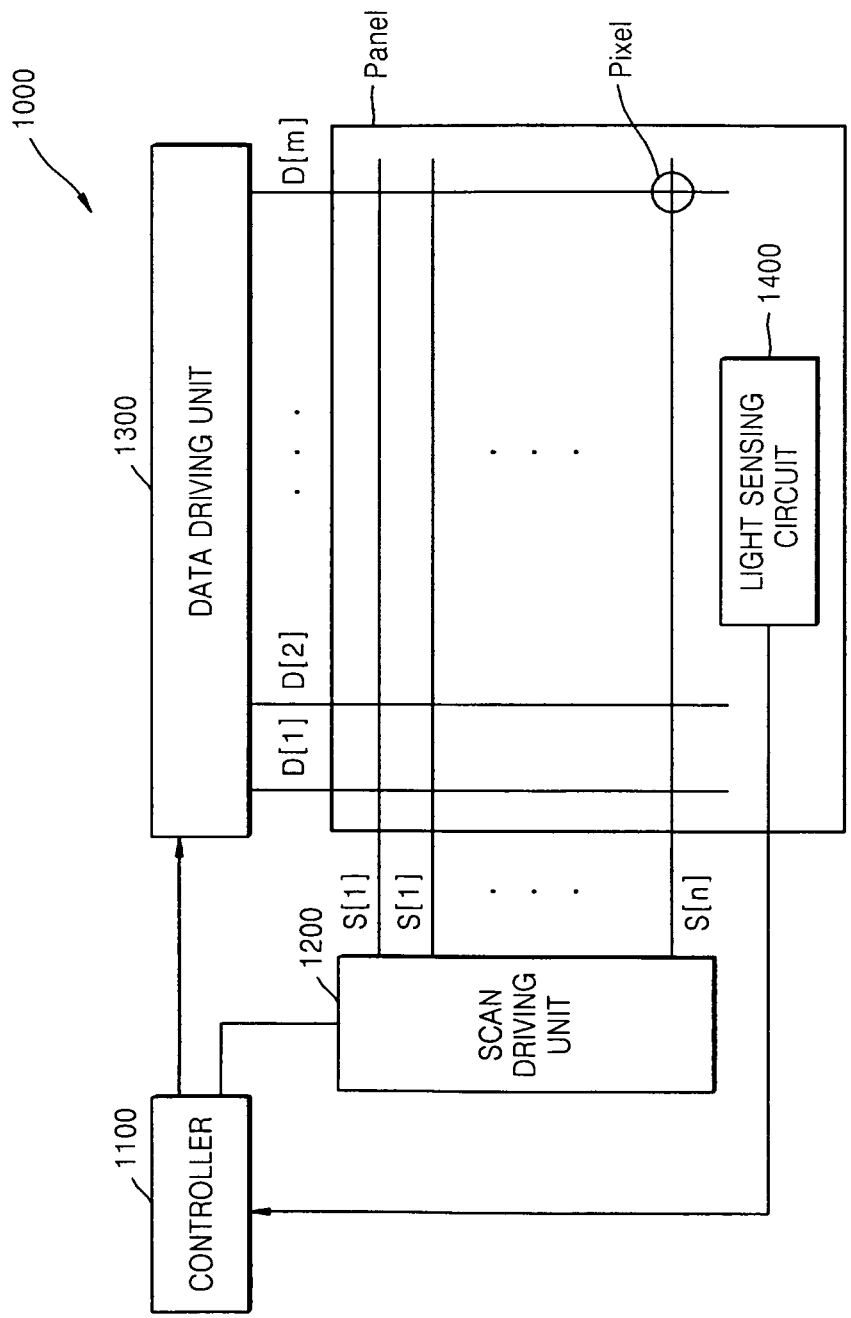
FIG. 10 is a block diagram of a flat panel display including a light sensing circuit, according to an embodiment of the present invention.

FIG. 10 is a block diagram of a flat panel display 1000 including a light sensing circuit, according to an embodiment of the present invention. Referring to FIG. 10, the flat panel display 1000 may include a plurality of pixels, a light sensing circuit 1400, driving units 1200 and 1300, and a controller 1100.

The controller 1100 controls the driving units 1200 and 1300 so that data is displayed. The controller 1100 also controls the brightness of data pieces displayed by the pixels, according to the brightness of light sensed by the light sensing circuit 1400.

The controller 1100 may be an embodiment of the calculation unit. In other words, the controller 1100 may receive a digital value generated by the light sensing circuit 1400 and calculate the brightness of a surrounding environment. A method of calculating the brightness of the surrounding environment may be implemented according to various algorithms. For example, a voltage value obtained by an ADC included in the light sensing circuit 1400 may be converted into brightness information according to a look-up table. Alternatively, a period of time required for the voltage value obtained by the ADC included in the light sensing circuit 1400 to increase or decrease to a specific voltage value may be measured, and the measured time period may be converted into the brightness information according to the look-up table. These methods of calculating the brightness of the surrounding environment are just examples, and thus the present invention is not limited thereto. In other words, various other methods may be used.

The driving units 1200 and 1300 receive a control signal and a data signal from the controller 1100 and apply corresponding signals to a plurality of scan lines S[1], S[2], . . . , and S[n] and a plurality of data lines D[1], D[2], . . . , and D[m], respectively. Due to the applications of the signals, data may be displayed on the pixels. Although it is illustrated in FIG. 10 that the driving units 1200 and 1300 are a scan driving unit 1200 and a data driving unit 1300, the present invention is not limited thereto. In other words, although the flat panel display 1000 is an organic light emission display device in FIG. 10, the flat panel display 1000 may be a PDP, an LCD, or the like. As such, it will be easily understood by one of ordinary skill in the art that the scan driving unit 1200 and the data driving unit 1300 of FIG. 10 may be replaced by driving units required by a PDP or an LCD.

The pixels are formed at regions where the scan lines S[1], S[2], . . . , and S[n] intersect the data lines D[1], D[2], . . . , and D[m]. Each of the pixels displays data according to a scan signal, a data signal, and the like. The displayed data may be data whose brightness has been controlled by the controller 1100.

The light sensing circuit 1400 may be installed at one surface of a panel on which the pixels are formed. The light sensing circuit 1400 may be one of the light sensing circuits of FIGS. 2 through 9.

Although it is illustrated in FIG. 10 that the entire body of the light sensing circuit 1400 is formed on the panel, the present invention is not limited thereto. For example, only a photodiode included in the light sensing circuit 1400 may be formed on the panel. In this case, the remaining portion of the light sensing circuit 1400 may be formed separately from the panel and installed to outside the panel.

As described above, a flat panel display according to the present invention may is able to more properly perform automatic brightness control by applying a light sensing circuit that precisely senses the brightness of a surrounding environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light sensing circuit comprising:
a first sensing circuit generating a current according to incident light and an ambient temperature; and
a second sensing circuit generating a current according to the ambient temperature, said second sensing circuit being shielded from the incident light, at least one of the first sensing circuit and the second sensing circuit comprising:
a photodiode;
an OP (operational) amplifier connected to the photodiode; and
an analog-to-digital converter (ADC) measuring a current generated in the photodiode and converting the current into a digital value.

2. The light sensing circuit of claim 1, wherein in said at least one of the first sensing circuit and the second sensing circuit, a first input terminal of the OP amplifier is connected to the photodiode, a reference voltage is applied to a second input terminal of the OP amplifier, and an output terminal of the OP amplifier is connected to the ADC.

3. The light sensing circuit of claim 2, wherein said at least one of the first sensing circuit and the second sensing circuit further comprises:
a capacitor connected between the first input terminal of the OP amplifier and the output terminal of the OP amplifier; and
a switch connected between the first input terminal of the OP amplifier and the output terminal of the OP amplifier.

4. The light sensing circuit of claim 1, wherein in said at least one of the first sensing circuit and the second sensing circuit, a reference voltage is applied to the first input terminal of the OP amplifier, and a second input terminal of the OP amplifier is connected to the photodiode.

5. The light sensing circuit of claim 4, wherein said at least one of the first sensing circuit and the second sensing circuit further comprises:
a transistor comprising a first electrode connected to the photodiode, a second electrode connected to the ADC, and a gate electrode connected to an output terminal of the OP amplifier; and
a switch connected between the photodiode and the reference voltage.

6. The light sensing circuit of claim 1, further comprising a calculation unit for receiving digital values obtained by first and second ADCs of the first and second sensing circuits and measuring brightness of incident light.

7. A light sensing circuit comprising:
a first photodiode;
a second photodiode;
a shielding film for shielding said second photodiode from externally incident light;
a voltage fixing unit connected to the first photodiode and the second photodiode and maintaining a voltage applied to the first photodiode at a certain value; and
an analog-to-digital converter (ADC) generating a digital value that depends on a current flowing in the first photodiode and the second photodiode.

8. The light sensing circuit of claim 7, wherein the voltage fixing unit comprises:
an OP (operational) amplifier comprising a first input terminal to which a reference voltage is applied, a second input terminal connected to the first photodiode, and an output terminal; and
a transistor comprising a first electrode connected to the first photodiode, a second electrode connected to the ADC, and a gate electrode connected to the output terminal of the OP amplifier.

9. The light sensing circuit of claim 8, wherein the voltage fixing unit further comprises a switch commonly connected to an anode of the first photodiode and a cathode of the second photodiode, said switch providing the reference voltage to the first photodiode.

10. The light sensing circuit of claim 7, wherein the voltage fixing unit comprises:
an OP (operational) amplifier comprising a first input terminal connected to the first photodiode, a second input terminal to which a reference voltage is applied, and an output terminal; and
a capacitor comprising a first electrode connected to the first input terminal of the OP amplifier and a second electrode connected to the output terminal of the OP amplifier.

11. The light sensing circuit of claim 10, wherein the voltage fixing unit further comprises:
a first switch connected between the first electrode and the second electrode of the capacitor and short-circuiting the capacitor; and
a second switch commonly connected to the first and second photodiodes and applying the reference voltage to the first photodiode.

12. The light sensing circuit of claim 11, further comprising a second voltage fixing unit disposed between the cathode of said second photodiode and said second switch, said second voltage fixing unit constantly maintaining a voltage applied to the second photodiode.

13. The light sensing circuit of claim 12, wherein the second voltage fixing unit comprises:
a second OP amplifier comprising a first input terminal connected to the second photodiode, a second input terminal to which the reference voltage is applied, and an output terminal; and
a transistor comprising a first electrode connected to the second photodiode, a second electrode connected to the anode of the first photodiode, and a gate electrode connected to the output terminal of the second OP amplifier.

14. The light sensing circuit of claim 13, wherein the second voltage fixing unit further comprises a third switch commonly connected to the first input terminal of the second OP amplifier and the cathode of the second photodiode, said second switch providing the reference voltage to the second photodiode.

15. A flat panel display having a plurality of pixels, a plurality of driving units driving the plurality of pixels, a controller controlling the driving units, and controlling the brightness of data displayed on the plurality of pixels, the flat panel display comprising:
a light sensing circuit sensing the brightness of externally incident light, the light sensing circuit comprising:
a first photodiode;
a second photodiode;
a shielding film for shielding said second photodiode from externally incident light;
a first voltage fixing unit connected to the first photodiode and maintaining a voltage applied to the first photodiode at a certain value; and
an analog-to-digital converter (ADC) generating a digital value that depends on a current flowing in the first photodiode and the second photodiode, said digital value being provided to said controller to enable said controller to control the brightness of data according to the light brightness sensed by the light sensing circuit.

16. The flat panel display of claim 15, the first voltage fixing unit comprising:
an OP (operational) amplifier comprising a first input terminal to which the reference voltage is applied, a second input terminal connected to the first photodiode, and an output terminal; and
a transistor comprising a first electrode connected to the first photodiode, a second electrode connected to the ADC, and a gate electrode connected to the output terminal of the OP amplifier.

17. The flat panel display of claim 16, the first voltage fixing unit further comprising a switch commonly connected to an anode of the first photodiode and a cathode of the second diode, said switch providing the reference voltage to the first photodiode.

18. The flat panel display of claim 15, the first voltage fixing unit comprising:
an OP (operational) amplifier comprising a first input terminal connected to the first photodiode, a second input terminal to which the reference voltage is applied, and an output terminal; and
a capacitor comprising a first electrode connected to the first input terminal of the OP amplifier and a second electrode connected to the output terminal of the OP amplifier.

19. The flat panel display of claim 18, wherein the first voltage fixing unit further comprises:
a first switch connected between the first electrode and the second electrode of the capacitor and short-circuiting the capacitor; and
a second switch commonly connected to an anode of the first photodiode and a cathode of the second diode, said switch providing the reference voltage to the first photodiode.

20. The flat panel display of claim 19, further comprising a second voltage fixing unit disposed between the cathode of said second photodiode and said second switch, said second voltage fixing unit constantly maintaining a voltage applied to the second photodiode.

21. The flat panel display of claim 20, wherein the second voltage fixing unit comprises:
a second OP amplifier comprising a first input terminal connected to the second photodiode, a second input terminal to which the reference voltage is applied, and an output terminal; and
a transistor comprising a first electrode connected to the second photodiode, a second electrode connected to the anode of the first photodiode, and a gate electrode connected to the output terminal of the second OP amplifier.

22. The flat panel display of claim 21, wherein the second voltage fixing unit further comprises a third switch commonly connected to the first input terminal of the second OP amplifier and the cathode of the second photodiode, said second switch providing the reference voltage to the second photodiode.

* * * * *